United States Patent [19]

Pressiat et al.

[11] 4,303,300

[45] Dec. 1, 1981

[54] ROTARY-JOINT DEVICE PROVIDING FOR AN OPTICAL WAVEGUIDE TRANSMISSION

[75] Inventors: Robert Pressiat; Guy de Corlieu; Marcel Malard; Luigi d'Auria, all of Paris, France

[73] Assignee: Thomson-CSF, Paris, France

[21] Appl. No.: 118,001

[22] Filed: Feb. 4, 1980

[30] Foreign Application Priority Data

Feb. 7, 1979 [FR] France .................... 79 03136

[51] Int. Cl.³ .................................................. G02B 5/14
[52] U.S. Cl. .................... 350/96.20; 250/227
[58] Field of Search .................... 350/96.20, 96.21; 250/227

[56] References Cited

U.S. PATENT DOCUMENTS

| | | | |
|---|---|---|---|
| 3,510,667 | 5/1970 | Cleveland et al. | 350/96.20 |
| 3,922,063 | 11/1975 | Marrone | 350/96.15 |
| 4,027,945 | 6/1977 | Iverson | 350/96.20 |
| 4,124,272 | 11/1978 | Henderson et al. | 350/96.20 |
| 4,190,318 | 2/1980 | Upton | 350/96.20 |

OTHER PUBLICATIONS

J. A. Henderson et al., "A Fiber Optic Rotational Coupler" *27th Electronics Components Conf.*, Arlington, Va. May 1977.

*Primary Examiner*—Stewart J. Levy
*Attorney, Agent, or Firm*—Edwin E. Greigg

[57] ABSTRACT

The rotary-joint device has the design function of maintaining accurate positioning of the ends of optical fiber conductors during relative rotation of external bodies to which the joint is coupled. The device comprises a male ferrule and a female ferrule so arranged as to form a shaft rotatably mounted within a sleeve with a close but compliant fit, an abutment device for limiting the axial displacement of the sleeve, means for centering the ends of the conductors, and means for securing said ferrules to external connector bodies so as to form a rigid coupling and a semi-rigid coupling respectively.

7 Claims, 8 Drawing Figures

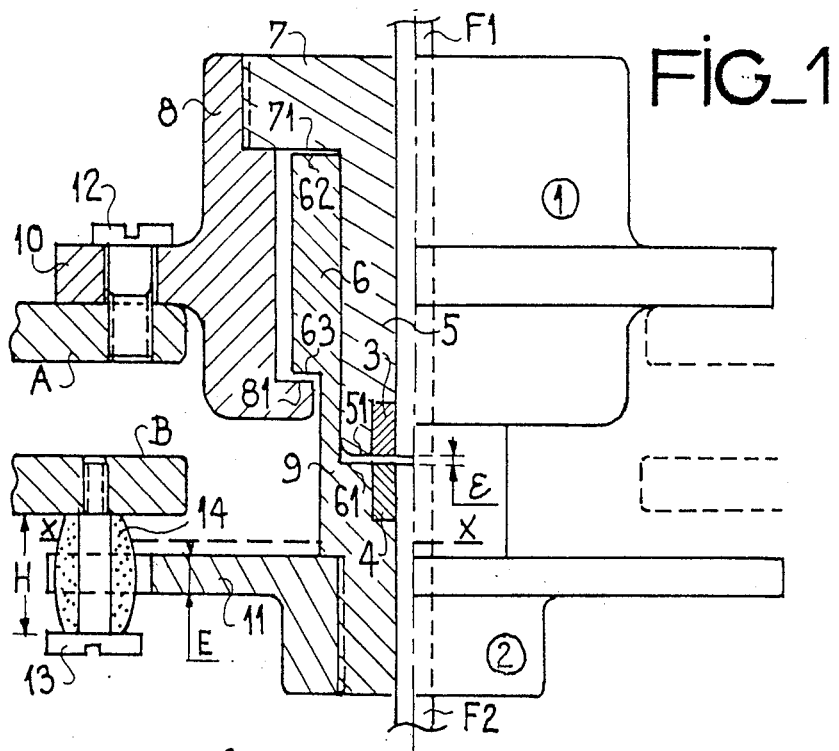
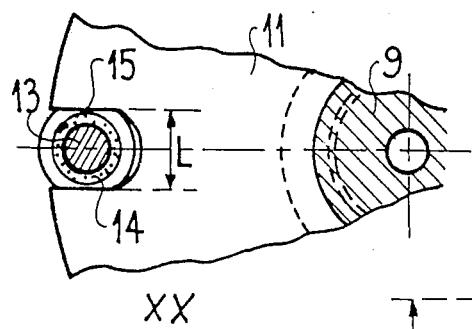
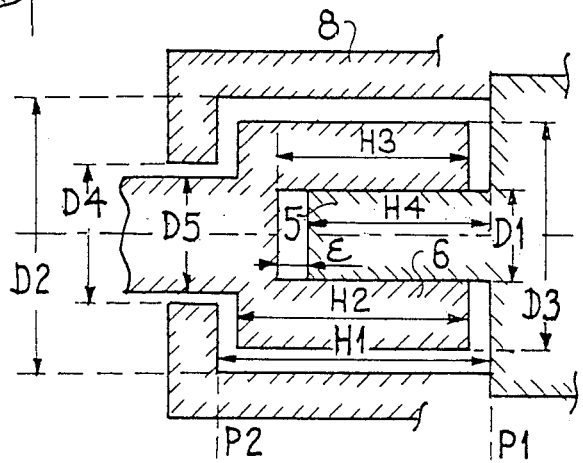

FIG_4
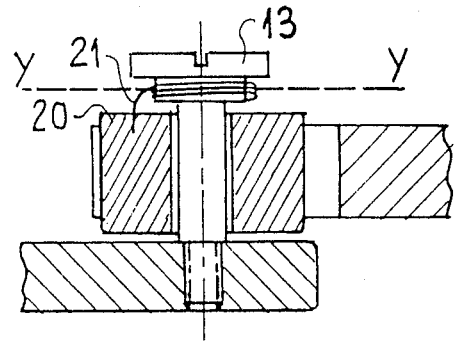
FIG_4-a
FIG_4-b
FIG_5
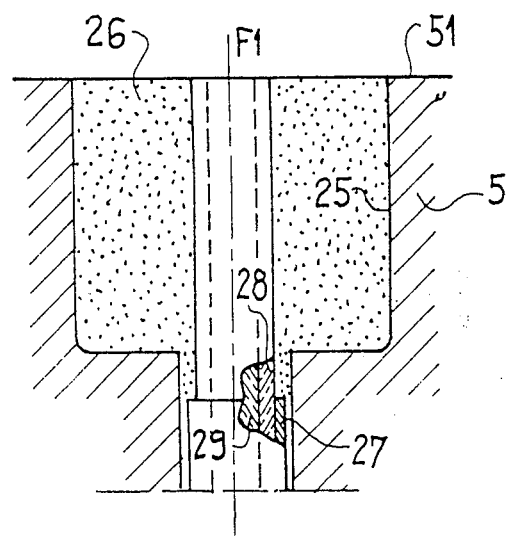

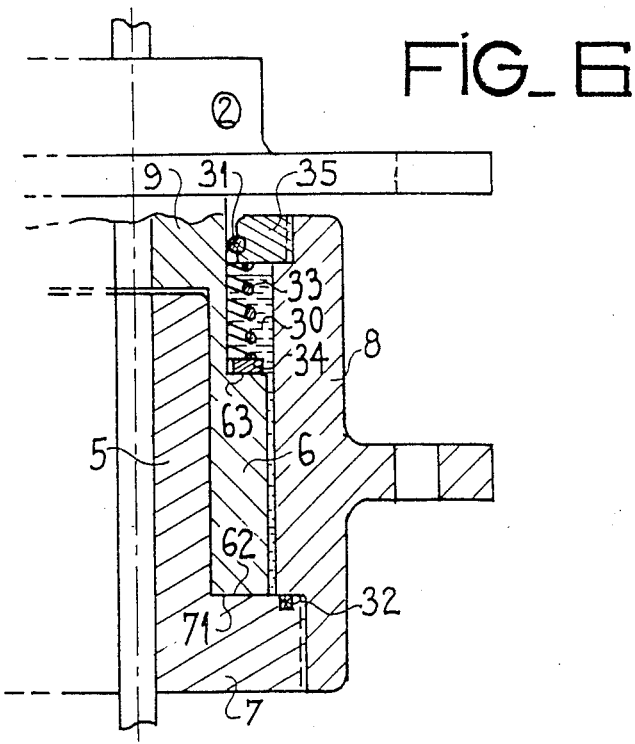
FIG_6
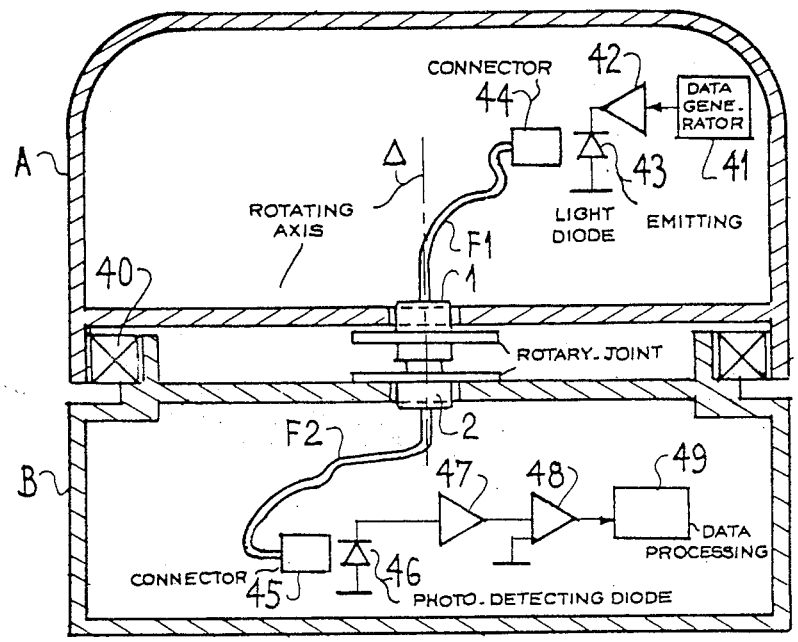
FIG_7

ROTARY-JOINT DEVICE PROVIDING FOR AN OPTICAL WAVEGUIDE TRANSMISSION

This invention relates to a rotary-joint device providing an optical waveguide transmission between two mechanical connector bodies which are relatively by rotatable about a common axis of rotation.

The invention is more particularly contemplated for highly reliable optical signal transmission in the case of a monomod-fiber optical conductor. Nevertheless, the term optical conductor is to be considered in a general sense which includes both the monomod-fiber version and the fiber bundle version to which the invention is also applicable.

Optical fibers are usually small-size conductors having dimensions such as an external diameter of 100 $\mu$m and a core diameter of 50 $\mu$m, for example. Furthermore, optical coupling between the opposite end faces of conductors to be connected together can be performed satisfactorily only if the mechanical play introduced during relative rotation of the external connector bodies remains compatible with very small tolerances of predetermined value in relation to fiber sizes. This condition cannot readily be satisfied, especially when the mechanical connector bodies are of large size, or else would carry a prohibitive cost penalty as a result of the high-precision machining involved.

During each rotation, the presence of mechanical play may produce a variation in relative positioning of the connector bodies in the axial direction; furthermore, the mechanical axes of the two connector bodies may not remain coincident in a common direction of rotation and may be relatively inclined (angular misalignment), or relatively displaced in the transverse direction (faulty centering), or may exhibit both of these defects. When transferred to the level of the opposite conductor faces, such variations produce a corresponding degradation of the optical coupling.

The rotary-joint device according to the present invention makes it possible to overcome these disadvantages by maintaining accurate position-location of opposite end faces and by ensuring excellent optical coupling as well as high reliability of transmission.

There is known to realise connectors for optical fiber conductors in which the two conductors are capable of axial rotation with respect to each other, a male portion and a female portion of the connector being rotatably mounted one within the other by means of mechanical positioning devices such as ball-bearings, for example. An assembly of this type is not intended to constitute a rotary joint in the strict sense of the term and does not guard against axial displacements and misalignments which are liable to occur during relative rotation of the two external connector bodies.

According to one distinctive feature of the invention, a rotary-joint device provides for an optical waveguide transmission between two associated connector bodies so arranged as to permit turning motion of one body relative to the other about an axis of rotation. The device comprises a male ferrule terminating in a cylindrical portion and a female ferrule terminating in an internally bored portion, the ferrules being coupled mechanically to said connector bodies respectively and also adapted to permit turning motion of one ferrule within the other about the axis of rotation; the ferrules are so arranged as to provide for axial accommodation of one conductor end in such a manner that the corresponding end faces of the conductors are disposed in oppositely-facing parallel relation and centered on the axis. The device according to the invention is distinguished by the fact that the diameters of the cylindrical portion and of the internally bored portion have substantially the same predetermined values in order to obtain a transition fit permitting a rotational displacement as well as a relative axial displacement, the ferrules being so arranged as to provide a mechanical abutment device for limiting said axial displacement. To achieve this, one ferrule is rigidly fixed to one of the connector bodies and the other ferrule is coupled to the other body in a semi-rigid assembly in order to protect the joint against any variations in positioning between the two rotating bodies as a result of mechanical play.

Other features and advantages of a rotary-joint device according to the present invention will be more apparent upon a consideration of the following description and accompanying drawings, wherein:

FIG. 1 is an axial half-sectional view showing one example of construction of a rotary-joint device according to the invention;

FIG. 2 is a diagram relating to the principal machining dimensions;

FIG. 3 is a detail diagram showing one of the means adopted for providing a mechanical coupling with the external connector bodies;

FIGS. 4a and 4b show alternative forms of construction of the coupling of FIG. 3;

FIG. 5 is a detail diagram showing a preferred solution for the centering of the optical conductors;

FIG. 6 is a partial diagram showing an alternative form of construction of the rotary joint of FIG. 1;

FIG. 7 is a simplified diagram showing one application of a rotary-joint device according to the invention.

The rotary-joint device illustrated in FIG. 1 comprises a male portion 1 and a female portion 2 which are relatively rotatable about a common axis $\Delta$ constituting the axis of rotation of the external connector bodies A and B to which said portions are mechanically coupled respectively. Each portion constitutes a ferrule for accommodating the optical conductor which is associated therewith. The optical conductors F1 and F2 can consist of one or a number of fibers, depending on whether the coupling is of the monomod-fiber type or of the fiber-bundle type. Each ferrule 1 and 2 is provided with an axial opening in order to accommodate the corresponding optical conductor F1 and F2. Centering means 3 and 5 are provided at the ends of the conductors in order to ensure that the end faces of the conductors are accurately centered on the axis $\Delta$ and in a plane at right angles to the axis.

The male ferrule 1 has a cylindrical end portion 5 or shaft whilst the female ferrule 2 terminates in an internally bored portion 6 having a corresponding diameter D1 (as shown in FIG. 2) in order to form a rotatable assembly with predetermined tolerances. Machining of contacting cylindrical surfaces is carried out with precision in order to obtain a transition fit (neither loose nor tight). Depending on the quality of fit required, the assembly is designed to provide either sliding or rotational displacement. By careful manufacture, for example in the case of a normal internal bore H7, it is possible to obtain either a rotating-joint H2-f7, a sliding joint H7-g6, or a sliding joint H7-h6 with a close fit. The choice is essentially dependent on the speed of rotation and on the periods of continuous operation which are contemplated.

The end faces of the conductors F1 and F2 are coplanar with the end surface 51 of the shaft 5 and the end surface 61 of the internally bored portion 6 which forms a sleeve.

The shaft 5 terminates at its other end in a larger diameter portion 7 or shouldered portion having a surface 71. The surface 62 which terminates the sleeve 6 can be abuttingly applied against said surface 71. The axial dimensions H3 and H4 of the elements 5 and 6 (shown in FIG. 2) are so determined that the distance $\epsilon$ between the transverse surfaces 51 and 61 (that is, between the parallel and opposite faces of the conductors F1 and F2) has a predetermined minimum value $\epsilon m$ which is equal to H3−H4 in the position of abutment of the surface 62. The rotary-joint device is so arranged as to have a second position of axial abutment to which there corresponds a maximum interface $\epsilon M$ between the optical conductors. The corresponding abutment device is produced by a member 8 secured mechanically by screwing to the shouldered portion 7 which is provided with a lateral screw-thread for this purpose. The member 8 has a corresponding lateral threaded portion for interassembly, a hollowed-out portion having a diameter D2 which is greater than the diameter D3 of the sleeve 6 and a terminal portion having a diameter D4 which is smaller than D3 in order to form a housing in which the sleeve 6 is capable of displacement. The second abutment position is obtained when the transverse surfaces 63 and 81 of the elements 6 and 8 come into contact with each other. The sleeve 6 is followed by a cylindrical portion or body 9 having a diameter D5 which is smaller than the diameter D4 of the terminal portion of the member 8. If the axial length of the sleeve 6 is designated as H2 and the axial length of the cavity is designated as H1, the difference H1−H2 represents the total range $\Delta\epsilon$ of relative axial displacement of the ferrules 1 and 2, the maximum interface being given by $\epsilon M = \epsilon m + \Delta\epsilon$.

Mechanical coupling of the ferrules 1 and 2 to the associated connector bodies A and B can be carried out as shown by means of flanges 10 and 11, one of the couplings being rigid whilst the other coupling is either semi-rigid or resilient. Thus the rotary joint maintains centering of the conductors F1 and F2 and optical coupling of these latter in spite of axial displacements and defects such as misalignment and off-center displacement which may arise during rotation between the connector bodies A and B. One of the coupling-flanges, namely the flange 10 in the example shown in the figure, is rigidly fixed to the connector body A by means of screws 12 and is constituted by a machined portion of the member 8. The fixing means 12 are disposed in uniformly spaced relation on a circumference; by way of example, provision can be made for three fixing means disposed at angular intervals of 120°. The coupling-flange 11 of the female ferrule 2 is formed by a member which is screwed on the threaded lateral end portion of the cylindrical body 9 so as to permit preliminary mounting of the sleeve 6 on the shaft 5 followed by screwing of the member 8 onto the shouldered element 7. Semi-rigid coupling to the connector body B is achieved by means of screws 13 and rings 14 inserted through slots 15 having a dimension L which is greater than the diameter of the rings (as shown in detail in FIG. 3). The bearing rings 14 are of material having high hardness and sliding capability such as hard nylon. The height H of the rings 14 is greater than the thickness E of the coupling-flange 11 so as to permit relative axial displacements between the connector bodies A and B. The slots or notches 15 are also located on a circumference in uniformly spaced relation.

It should be noted that the rotary-joint device is supported by the external connector body to which it is rigidly fixed, namely the connector body A in the example shown in FIG. 1 although it will readily be understood that the couplings can be reversed. In the same concept, any position can be adopted for the axis $\Delta$ which can thus be vertical as illustrated but could also be horizontal or the like.

The couplings can be formed in a number of different ways and FIGS. 4a and 4b illustrate one alternative form of construction of the semi-rigid coupling. In these figures, the ring is replaced by an oblong member 20 which has an elliptical cross-section and is capable of pivotal displacement about the screw 13. A helical spring 21 secured at one end to the screw 13 and at the other end to the member 20 causes this latter to bear on the sides of the slot 15. The effect thereby achieved is to guard against jerky operation, especially in the event of any change in the direction of rotation, and also in the event of acceleration or deceleration.

FIG. 5 relates to a preferential embodiment of the means 3 and 4 for centering the ends of the conductors F1, F2. The mechanical component such as the shaft 5, for example, has an internal bore 25 filled at the end of this latter with a material 26 which is capable of exhibiting the phenomenon of creep deformation in much the same manner as a viscous fluid which is subjected to a high pressure. This material can be a metal (lead, tin, antimony) or a plastic such as a polyamide or a polycarbonate or a polyfluoroethylene having a lower degree of hardness than that of the glass which constitutes the conductor. A corresponding centering technique is described in French patent Application No. 76 13003 published under U.S. Pat. No. 2,349,843. The end portion of the outer plastic jacket 27 of the conductor F1 is stripped in such a manner as to leave, in the case of a single fiber, the sheath 28 which surrounds the core 29. After creep deformation and hardening, the end of the fiber is thus perfectly centered and then machined in order to make it coplanar with the surface 51 and to provide it with an optical polish. Hardening can be obtained by cooling of the material which has previously been heated (in the case of metals) or by final thermal action (in the case of plastics).

In a preferential embodiment, the rotary-joint device is so arranged as to comprise lubricating means for facilitating the movement of rotation of components and reducing wear caused by friction, the liquid employed being chosen as a function of its refractive index in order to avoid any interference with the optical coupling in the interface portion between the conductors.

Furthermore, mechanical means are provided for exerting an axial pressure in order to ensure that the sleeve is abuttingly applied against the shouldered portion 7 and that the interface clearance has the minimum value $\epsilon m$. FIG. 6 gives one example of a corresponding arrangement. The liquid 30 is a lubricant and an index-adapting agent which is introduced beforehand and can consist of glycerin, eucalyptol, cedar oil, various immersion oils, naplital monobromide and so forth. The mechanical arrangements comprise seals 31, 32, a spring 33 and a washer 34. The end portion of the member 8 which forms a thrust-bearing abutment for the spring is constituted by an added element 35 having an external screw-thread. Compression of the spring 33 exerts a pressure on the surface 63 and the sleeve 6 is applied in abutting contact so that the surface 62 comes into contact with the surface 71 of the shouldered portion 7. Circulation of the fluid 30 can take place by capillarity or can be facilitated by means of grooves forming ducts and machined for this purpose in the contacting surfaces of the elements 5 and 6.

The diagram of FIG. 7 illustrates one example of application. The connector body B is stationary and the connector body A is driven in rotation about the axis Δ. The driving means are represented schematically by ballbearing units 40. An optical emitter is installed within the structure A in which provision is made for data-generating means 41, an amplifier 42, a photoemissive diode 43 and a unit 44 for establishing a connection with the fiber F1. In the structure B, the fiber F2 is connected through a unit 45 to a receiver in which the following elements, for example, are grouped together: a photodetecting diode 46, an amplifier 47, a threshold comparator 48 and data-processing and utilizing means 49. The rotary-joint 1-2 makes it possible in accordance with the invention to isolate mechanically the interface positioning of the conductors from the effects resulting from mechanical play within the external structures, A, B and 40 during rotational motion; as mentioned in detail in the foregoing description, these effects are liable to produce relative displacements in the axial direction or transversely to the axis. It is readily apparent that the dimensions of the coupling-flange 11, in particular the thickness E (FIG. 1) of said flange and the width L of the slots (FIG. 3) are determined in relation to the dimensions of the securing and bearing elements 13, 14 while taking into account the amplitudes of relative movement between the structures A and B during rotation, particularly in the case of the relative axial movement.

What is claimed is:

1. A rotary-joint device providing for an optical waveguide transmission between two bodies which are relatively rotatable about a common axis of rotation comprising:

a male ferrule with a cylindrical portion and a female ferrule with an internally bored cylindrical portion having a diameter substantially equal to the diameter of the cylindrical portion of the male ferrule to form a shaft rotatably mounted within a sleeve with a close but compliant fit therebetween permitting rotational displacement and relative axial displacement.

one end of optical waveguide conductors placed along an axis of the ferrules to ensure that corresponding end faces of the optical waveguide conductors are disposed in opposed parallel relation centered on the axis, an abutment device for limiting displacement along the axis of the sleeve and controlled by the ferrules utilized, means for mechanically coupling the ferrules respectively to said bodies so as to permit rotational motion of said ferrules about said axis, a rigid assembly for the coupling means coupling one of the ferrules to one of the external bodies, a semi-rigid assembly for coupling the other ferrule to the other body, resilient means for the abutment device for extending a pressure on the sleeve and bringing the sleeve to an abutment position corresponding to a minimum value of interface between the optical waveguide conductors, and means for lubricating contacting surfaces during rotation and entailing use of a liquid having a refractive index adapted to optical coupling within the interface and sealing elements, whereby the rotary joint is isolated from variations in relative positioning of the two bodies as a result of mechanical play, centering and optical coupling is maintained for the optical waveguide conductors notwithstanding any axial displacements and defects in misalignment and off-center displacement arising during rotation between the ferrules.

2. A device according to claim 1, wherein the mechanical abutment device is formed by two surfaces located transversely to the axis of the male ferrule, two transverse surfaces of the internally-bored portion of the female ferrule which forms a sleeve being capable of abutting contact respectively with said transverse surfaces of said male ferrule, the axial distances between said surfaces being so determined as to form an interface between said end faces and to remain within a predetermined range.

3. A device according to claim 1, wherein each ferrule comprises means for centering the conductor ends in the form of an internally-bored portion filled with material which exhibits creep deformation.

4. A device according to claim 1, wherein the mechanical coupling means comprise in the case of each ferrule a flange coupled mechanically to the associated body by means of fixing elements as well as by means of bearing elements in the case of the semi-rigid coupling, the flange relating to the semi-rigid coupling being provided with recesses having predetermined dimensions so as to permit axial and transverse displacements of the corresponding fixing and bearing elements which are rigidly fixed to the associated body.

5. A device according to claim 4, wherein the fixing elements are constituted by screws disposed in uniformly spaced relation on the coupling-flanges and the bearing elements by means of rings mounted on the corresponding screws.

6. A device according to claim 4, wherein the fixing elements are constituted by screws disposed in uniformly spaced relation on the coupling-flanges and the bearing elements by means of oblong members mounted on the corresponding screws and constrained by a restoring spring to bear on the recesses of the corresponding coupling-flange.

7. A device according to claim 4, wherein the male ferrule comprises the cylindrical portion which terminates at one end in a shouldered portion so as to constitute a first abutment surface, the shouldered portion being provided with a lateral screw-thread so as to be joined to a member which has the second abutment surface and also forms a first coupling-flange, the female ferrule being such as to have a cylindrical body extended by the sleeve and having a lateral threaded portion in order to be joined to a member forming the second coupling-flange.

* * * * *